(12) United States Patent
Simon

(10) Patent No.: US 11,248,736 B2
(45) Date of Patent: Feb. 15, 2022

(54) LAP TOP WORKSTATION WITH LEVELING ADJUSTABILITY AND ACCESSORY ATTACHMENT FEATURES

(71) Applicant: David Simon, Lakeland, FL (US)

(72) Inventor: David Simon, Lakeland, FL (US)

( * ) Notice: Subject to any disclaimer, the term of this patent is extended or adjusted under 35 U.S.C. 154(b) by 0 days.

(21) Appl. No.: 17/219,031

(22) Filed: Mar. 31, 2021

(65) Prior Publication Data

US 2021/0310603 A1    Oct. 7, 2021

Related U.S. Application Data

(60) Provisional application No. 63/003,506, filed on Apr. 1, 2020, provisional application No. 63/041,309, filed on Jun. 19, 2020, provisional application No. 63/050,959, filed on Jul. 13, 2020, provisional application No. 63/133,458, filed on Jan. 4, 2021, provisional application No. 63/137,203, filed on Jan. 14, 2021.

(51) Int. Cl.
*F16M 11/12* (2006.01)
*F16M 11/04* (2006.01)

(52) U.S. Cl.
CPC ......... *F16M 11/126* (2013.01); *F16M 11/041* (2013.01)

(58) Field of Classification Search
CPC ............................ F16M 11/126; F16M 11/041
USPC ....................... 248/127, 130, 371, 141, 155.3
See application file for complete search history.

(56) References Cited

U.S. PATENT DOCUMENTS

| 7,040,591 | B1 | 5/2006 | Simon | |
|---|---|---|---|---|
| 7,766,297 | B2* | 8/2010 | Chih | F16M 11/10 248/349.1 |
| 8,991,775 | B2* | 3/2015 | White | F16M 11/041 248/122.1 |
| 9,140,406 | B2 | 9/2015 | Simon | |
| 10,743,682 | B2* | 8/2020 | Speagle | F16M 11/08 |
| 2007/0007423 | A1* | 1/2007 | Wang | F16M 11/18 248/454 |
| 2007/0041150 | A1* | 2/2007 | Short | F16M 11/10 361/679.22 |
| 2008/0101853 | A1* | 5/2008 | Huang | F16M 11/10 403/92 |
| 2011/0232540 | A1* | 9/2011 | Benoni | F16M 13/00 108/59 |
| 2013/0048802 | A1* | 2/2013 | Guran | F16M 13/00 248/122.1 |
| 2013/0092805 | A1* | 4/2013 | Funk | F16M 13/00 248/121 |
| 2013/0105644 | A1* | 5/2013 | Yu | F16M 13/022 248/125.7 |
| 2019/0045143 | A1* | 2/2019 | Williams, IV | F16M 11/40 |
| 2021/0001470 | A1* | 1/2021 | Fox | F16M 11/16 |

* cited by examiner

*Primary Examiner* — Muhammad Ijaz
(74) *Attorney, Agent, or Firm* — John R Benefiel

(57) ABSTRACT

A lap top work station featuring an adjustable side by side tilting of a main support platform for eliminating a side by side out of level condition caused by a structural deformation and also featuring a pair of accessory mounting sockets, both features are accomplished by a pair of clevis, one clevis assembly attached at the end of a cross arm to provide the out of level condition, and the other fixed to the back of the main support platform and the other clevis assembly supporting the accessory mounting sockets.

2 Claims, 5 Drawing Sheets

LAP TOP WORKSTATION WITH LEVELING ADJUSTABILITY AND ACCESSORY ATTACHMENT FEATURES

CROSS REFERENCE TO RELATED APPLICATIONS

This application claims the benefit of U.S. provisional patent application Ser. No. 63/003,506 filed on Apr. 1, 2020; 63/041,309 filed on Jun. 19, 2020; Ser. No. 63/050,959 filed on Jul. 13, 2020; Ser. No. 63/133,458 filed on Jan. 4, 2021; and Ser. No. 63/137,203 filed on Jan. 14, 2021, all of which are incorporated by reference.

BACKGROUND OF THE INVENTION

This invention concerns holders for electronic devices and books sometimes referred to as lap top workstations. Such workstations are described in U.S. Pat. Nos. 7,040,591 and 9,140,406 issued to the present inventor.

Such devices either rest on the floor or are attached to a piece of furniture. The devices include a support structure for a flat platform on which may receive an electronic device such as lap top computers, or books, etc.

The platform may tilt significantly from the vertical due to uneven deflection of the support structure which cannot be made rigid since it would then be too heavy. Thus, the support structure for a workstation designed to rest on the floor and not being anchored to a fixed structure, such tilting to a variable degree has not heretofore been able to be avoided.

Another deficiency in these devices has been the lack of any ability to conveniently add accessories to the work station, such as tablets, etc.

Accordingly, it is an object of the present invention to provide a practical way to conveniently correct such variable tilting of the platform of a lap top work station.

A further object of the invention is to provide a means conveniently enabling accessories to be added to the workstation.

SUMMARY OF THE INVENTION

These and other objects of the invention are achieved by a lap top station having a base rollable on a supporting surface an upright member mounted to the base, and a cross arm projecting away from top of the upright member.

An away end of the cross arm is connected to a planar main platform able to support a lap top computer by a connection which allows side to side swinging of the main platform about a vertical axis (FIG. 2A), passing through the center of a short vertical clevis set and tilting towards and away from the vertical about a horizontal axis H-1 (FIG. 2A) extending lengthwise through an elongated horizontal clevis set parallel to the main platform and allows rotation of the main platform about a horizontal axis H-2 (FIG. 2A) extending cross way through the elongated horizontal clevis set aligned with the cross arm and a selectively engaged threaded stop preventing pivoting of the platform at any point along its range of pivoting motion about the horizontal axis H-2 (FIG. 2a) aligned with the cross arm so that any out of level condition can be thereby corrected.

This connection allowing tilting motion of the main platform includes the elongated horizontal clevis set with an outer clevis fixed to the back of the main platform. The elongated horizontal clevis set has pivots at either end to allow the main platform to be pivoted about the horizontal axis H-1 (FIG. 2A) as well as a socket at either end of the elongated horizontal clevis set, each socket able to receive a shaft connected to each accessory, the shaft table to be inserted into a socket and to be secured therein with a retainer element.

DESCRIPTION OF THE DRAWING FIGURES

DETAILED DESCRIPTION

Figure 1:
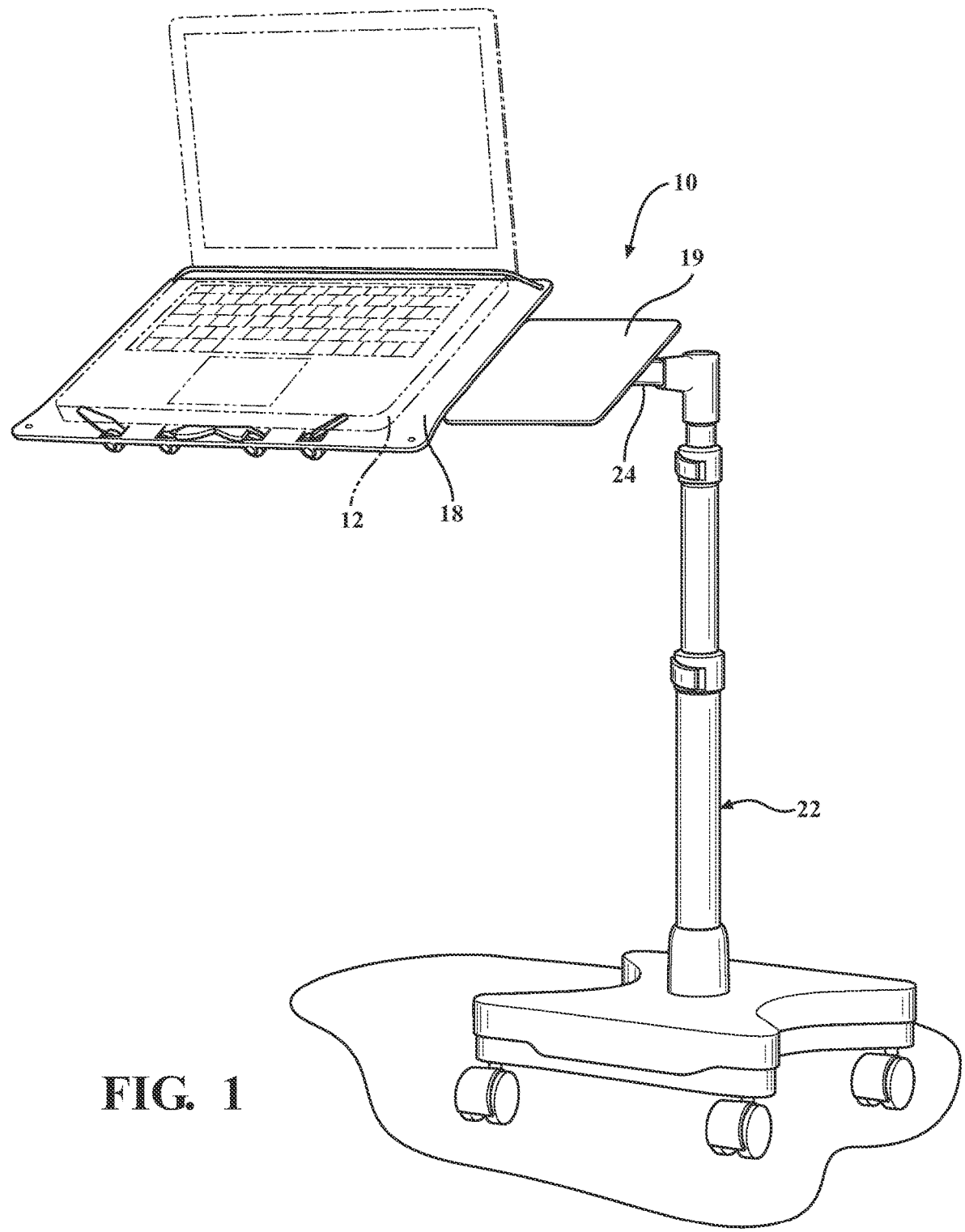
FIG. 1 is a perspective view of a lap top workstation having a lap top computer supported thereon.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

The workstation 10 is designed for supporting lap top computers or other electronic devices 12 on a flat platform 18, and books (not shown) or tablets (not shown).

The particular novel features shown in the drawing FIGS. 2-5 comprise an arrangement included in a connection assembly 16 between the cross arm 24 and the platform 18 which conveniently allows leveling the platform 18 on which the lap top 12 rests as necessary (as described in detail below).

A second novel feature comprises a pair of sockets 20 which are included in the main platform 10 connection assembly 16, which allows for conveniently adding one or two accessories such as a small tablet platform 19 for holding a tablet (not shown).

The connection assembly 16 includes an elongated horizontal clevis set 26 integrally formed with an attachment disc 28 attached to the undersurface of the main platform 18 with suitable fasteners.

An elongated clevis set 26 has ends 34 received over ends 36 of the outer clevis 26.

Figure 5:
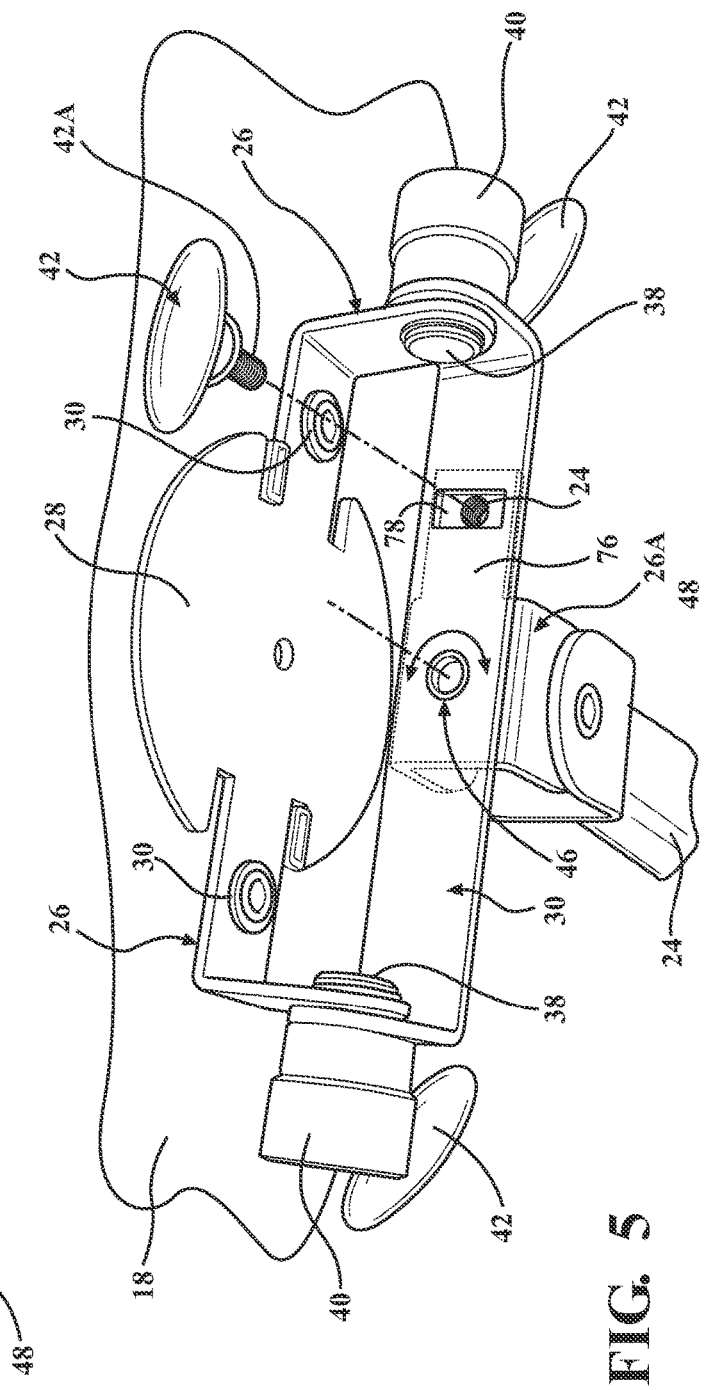
FIG. 5 is a view of the connection assembly as shown in FIGS. 2 and 3 but from the reverse side and from below, depicting the partially exploded components.

Pivots 38 allow rotation of the two devises 26, 32 which adjusts the vertical angle of the platform 18 (FIG. 5). A tight connection provided by the pivots 28 frictionally holds the platform 18 at any selected vertical angle.

Tubular sockets 40 are integral with the pivots 38 and create a means for attaching accessories such as the tablet platform 19.

Figure 3:
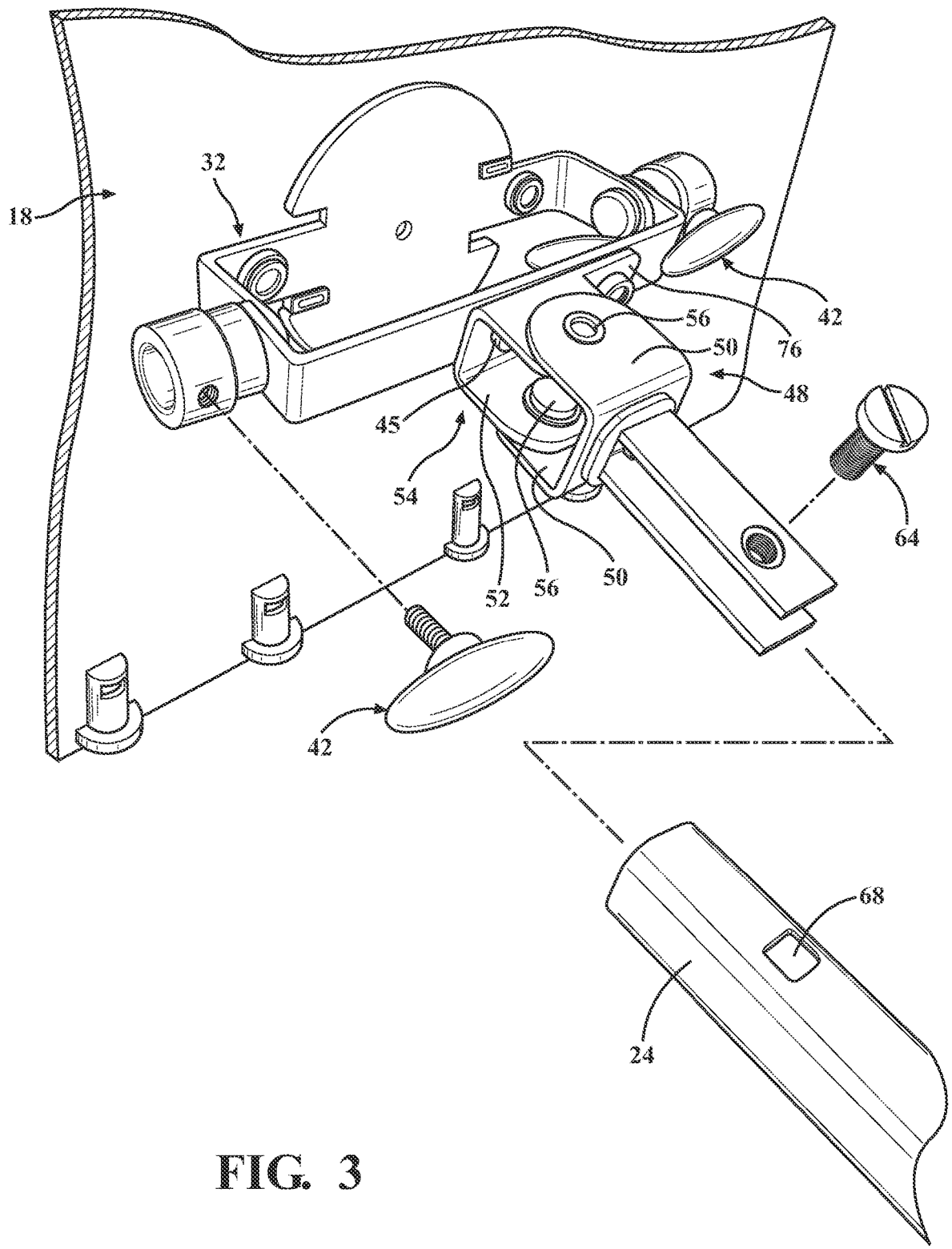
FIG. 3 is a perspective view of the connection assembly with an exploded view of a connection to the workstation member.

Handled threaded pins 42 secure the same in position therein (FIG. 3).

Figure 2:
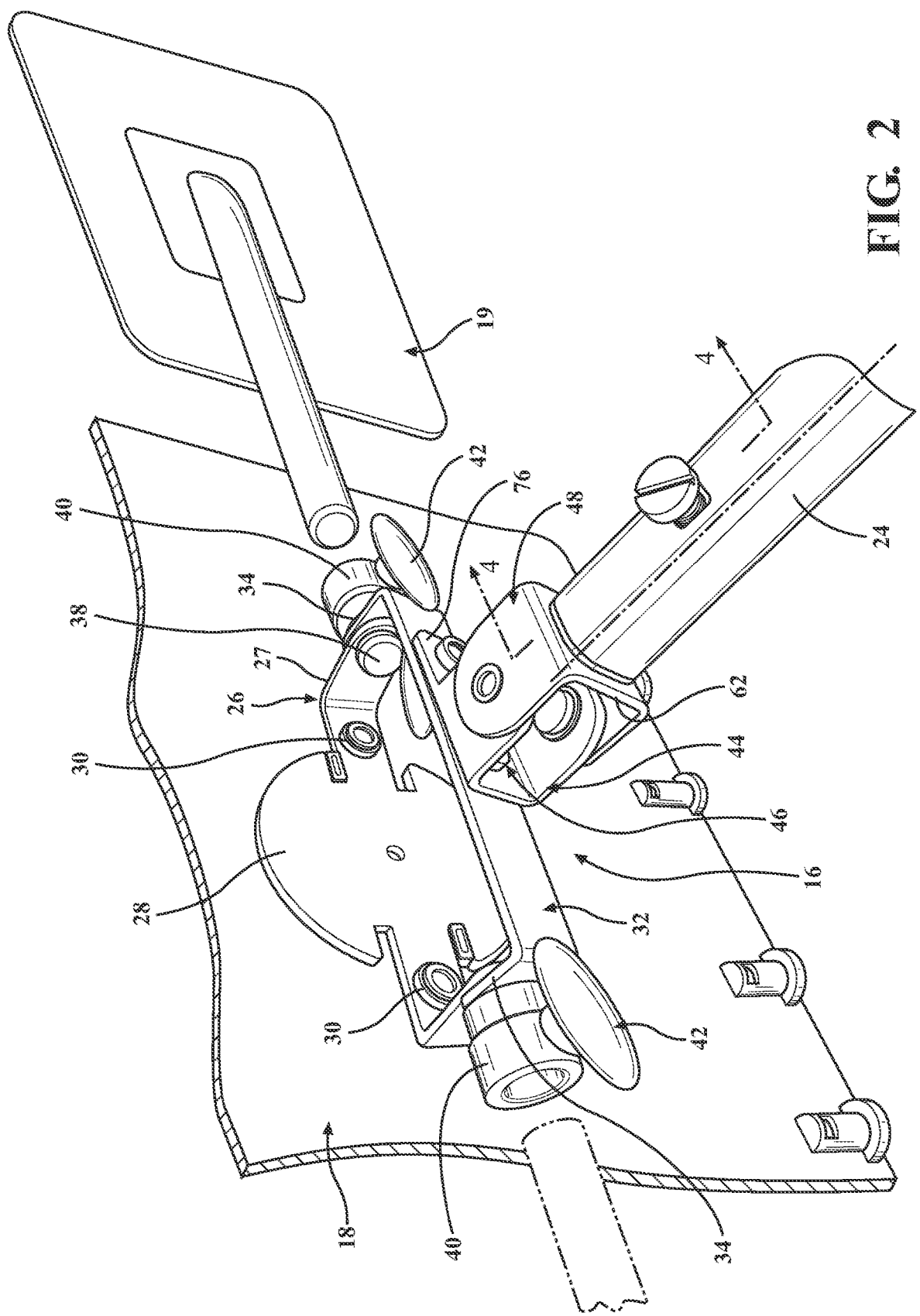
FIG. 2 is a partially exploded perspective view of a connection assembly as well as a fragmentary portion of a platform to which the connection assembly as attached and supported member.
Figure 2A:
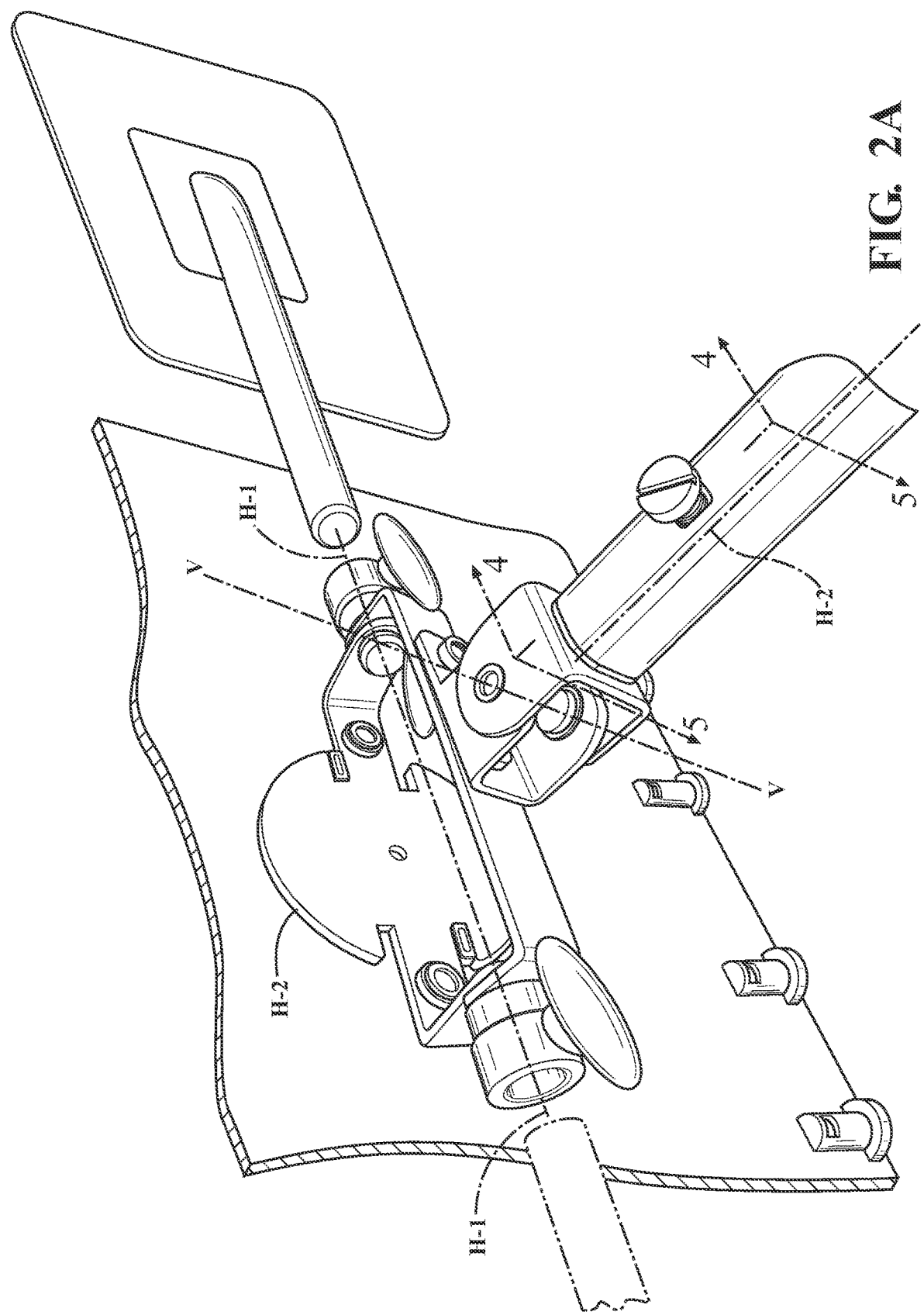
FIG. 2A is a view of FIG. 2 with two horizontal axes and one vertical axis shown.

The elongated horizontal clevis set 32 is pivotally connected to the shorter vertical clevis set 48 by a pivot 56 (FIG. 3) at the center of the inner clevis 44 (FIGS. 2, 3 and 5).

The vertical short clevis set 48 has an outer clevis which has a pair of sides 50 receiving sides 52, of an upper clevis 54 and pivotally connected thereto by pivots 56 (FIG. 3). This allows swinging of the platform 18 to either side. The pivots 56 are frictionally engaged to maintain any adjusted position in the well known manner.

FIG. 5 shows elements of the arrangement necessary for leveling of the platform 18.

This includes the previously mentioned pivot 46 which allows limited side to side pivoting of the horizontal clevis members 32 and 26 and attached platform 18 when a threaded pin 42A of a handled pin 42 is loosened.

The handled pin thread 42A passes through a slot 74 in an extension tab 76 integral with the second bracket 32. The slot 74 is elongated sufficiently to accommodate limited pivoting of the outer clevis 26A of the vertical clevis 26A.

When handled pin thread 42A is loosened sufficiently to enable the platform 18 to be moved, the platform 18 can be pivoted slightly within the limits of slot 74 (FIG. 5) as necessary to achieve level, and then retightened.

Figure 4:
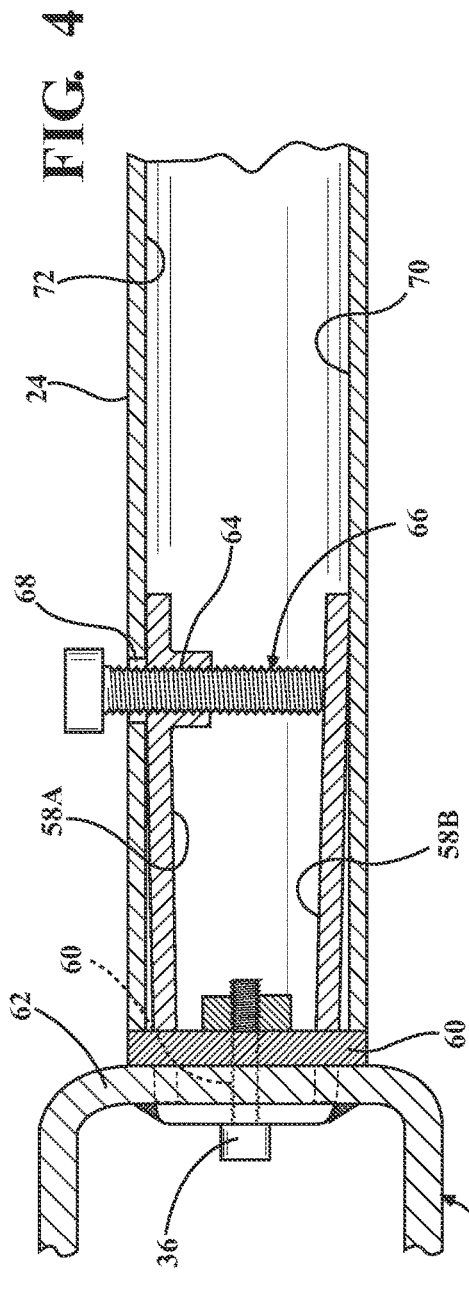
FIG. 4 is an enlarged sectional view of the connection shown in FIG. 3.

FIGS. 3 and 4 show the rigid connection of the member 24 with the elongated horizontal clevis 48. The connection is described in the interest of completeness.

The claims of the present application are not directed to this connection.

A pair of spaced apart parallel blades 58A, 58B extend away from an end plate 60 attached as by a screw 64 to a connector portion 62 of the second clevis 48.

The blade 58A has a threaded feature 64 receiving a screw 66 which passes through a square hole 68 in member 24.

The screw 66 is long enough to reach the lower blade 58B and apply pressure thereto forcing it against lower inner wall 70 when tightened. At the same time, the screw 66 also drives the upper blade 58A against an upper side 72 of member 24 creating a very rigid connection between member 24 and horizontal clevis 48. This prevents any looseness from developing at that joint which would negatively affect use of a lap top.

The invention claimed is:

1. A work station comprising:
 a support structure for holding an upright support platform used to support an electronic device or non-electronic items, said support platform subject to tilting to the side from the vertical due to uneven deflection of said support structure;
 said support structure including a horizontally extending cross arm;
 a first clevis assembly mounted to a back of said support platform and including a pair of interfit U-shaped pieces, each said piece defining one side of said first clevis assembly;
 a second clevis assembly also having a pair of interfit U-shaped pieces also defining one side of said second clevis assembly one side attached to an end of said cross arm;
 said second clevis assembly also having a first side attached to a second side of said first clevis assembly to enable manual rotation of said first side of said second clevis assembly; a frictional force arranged to hold any adjusted position of said second clevis assembly;
 said second clevis assembly requiring exertion of a higher second friction force to reposition the second clevis assembly;
 said second side of said first clevis assembly able to be manually rotated about an axis normal to said second side to an extent limited by a slot extension feature of said second side, and a screw passing through said slot in said extension feature, a limited associated rotational adjustment movement of said support platform to restore a vertical position of said support platform.

2. The work station according to claim 1 wherein an end of each U-shaped piece of said first clevis assembly has an aligned socket mounted thereto rotatably movable thereon and held in any adjusted position by a threaded set screw, said socket able to thereby hold an adjustably mounted optional attachment to said first clevis assembly.

* * * * *